(12) United States Patent
Mogul

(10) Patent No.: US 7,995,595 B1
(45) Date of Patent: Aug. 9, 2011

(54) METHOD FOR EFFICIENTLY DETECTING NODE ADDRESSES

(75) Inventor: Jeffery C. Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 12/261,789

(22) Filed: Oct. 30, 2008

(51) Int. Cl.
*H04L 12/28* (2006.01)
(52) U.S. Cl. ......................... 370/403; 711/128
(58) Field of Classification Search .................. 370/403, 370/392; 711/128
See application file for complete search history.

(56) References Cited

U.S. PATENT DOCUMENTS

| | | | |
|---|---|---|---|
| 6,654,796 B1 | 11/2003 | Slater et al. | |
| 6,779,039 B1 | 8/2004 | Bommareddy et al. | |
| 7,283,563 B1 | 10/2007 | Allan | |
| 7,359,328 B1 | 4/2008 | Allan | |
| 7,359,404 B1 | 4/2008 | Allan | |
| 2002/0143755 A1* | 10/2002 | Wynblatt et al. | 707/3 |
| 2006/0047912 A1* | 3/2006 | Chinnakonda | 711/128 |
| 2007/0086455 A1* | 4/2007 | Allan et al. | 370/389 |
| 2008/0043737 A1* | 2/2008 | George et al. | 370/392 |
| 2008/0313450 A1* | 12/2008 | Rosenberg | 713/2 |

* cited by examiner

*Primary Examiner* — Dang T Ton
*Assistant Examiner* — Wei Zhao

(57) ABSTRACT

According to one embodiment, node addresses are efficiently detected. For example, a node address is extracted from a packet that is being communicated from a first network to a second network through a network element. An abstraction of the node address is determined. A determination is made as to any previously received packets correspond to the node address by comparing the abstraction to a plurality of abstractions that correspond to node addresses extracted from the plurality of previously received packets. The abstraction is added to the plurality of abstractions if the node address is not associated with any of the previously received packets.

20 Claims, 5 Drawing Sheets

METHOD FOR EFFICIENTLY DETECTING NODE ADDRESSES

BACKGROUND

With the advent of computers and networks, companies have been using computers to store information and to communicate that information between the computers. The computers associated with a network are also known as "nodes." As companies have grown, they are using more and more computers to store and communicate ever increasing amounts of information. As the numbers of computers increase, the companies are encountering more problems in maintaining an inventory and the lay out of their computers and the associated software assets so that the company's Information Technology (IT) personnel can detect and diagnose networking problems as a part of managing the computers.

Further, companies have always had to protect information that is considered to be sensitive. With the advent of computers, sensitive information can be communicated between computers over networks. People with malicious intent can gain access to a company's sensitive information, for example, by infiltrating a computer that is associated with the company's network. Therefore, companies want to maintain an inventory of their computers, and the software assets that are associated with the computers, so that their computers are properly managed.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

Figure 1:
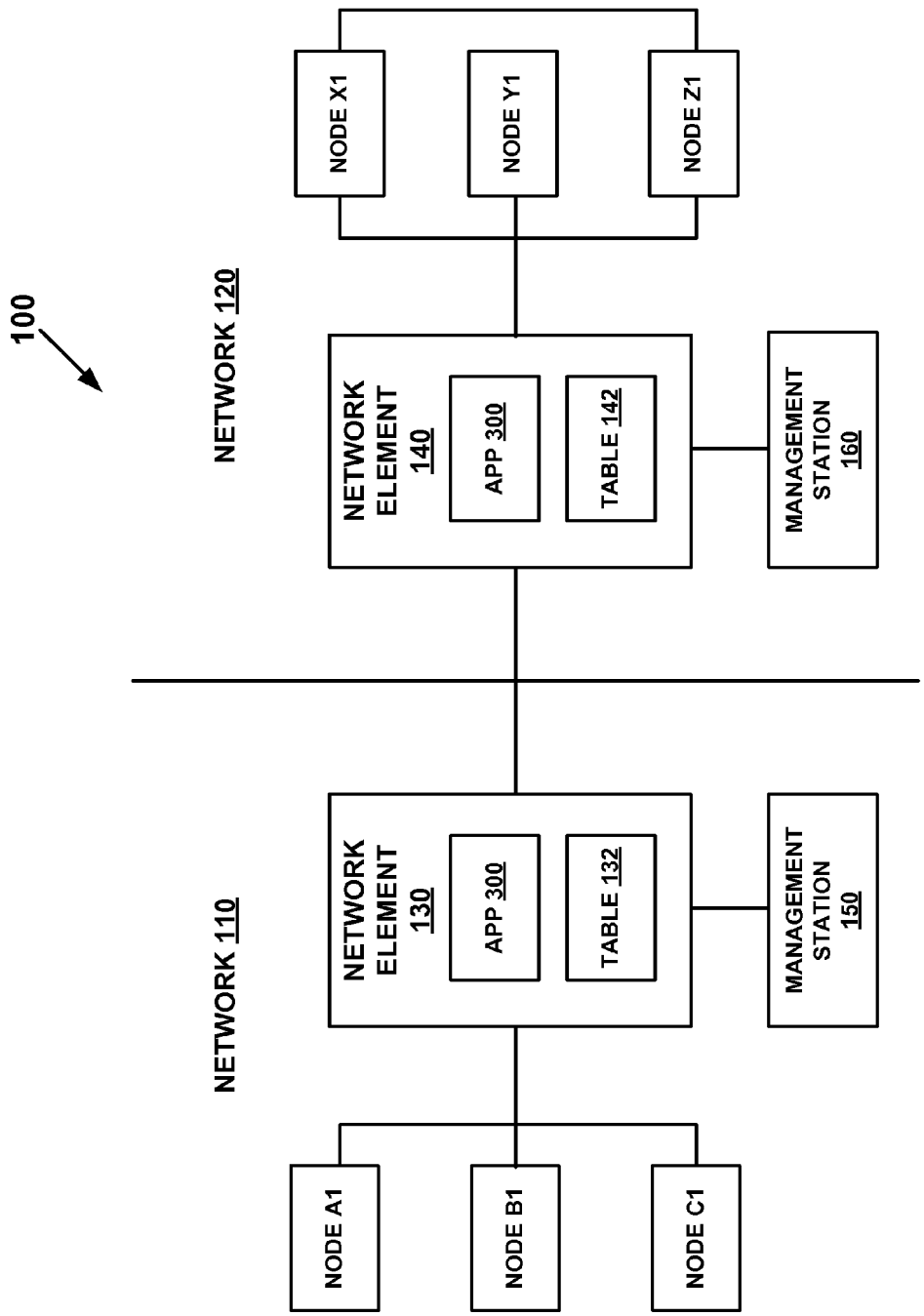
FIGS. 1 and 2 depict block diagrams of systems that use apparatuses for efficiently detecting node addresses, according to various embodiments.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "extracting", "determining," "adding," "using," "communicating," "selecting," "receiving," or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

Overview of Discussion

In order for nodes to communicate over a network, the nodes are assigned IP addresses from an address space. As companies have grown, they are using more and more nodes to store and communicate ever increasing amounts of information and therefore they are using larger address spaces for assigning IP addresses to their nodes. An example of a company that would have a large number of nodes associated with one or more of their networks is a mobile phone provider. Further, as people with malicious intent are becoming more and more sophisticated in their abilities to infiltrate nodes, new methods of protecting nodes are being developed. One method of protecting nodes involves increasing the size of the address space that nodes for a network can potentially be selected from and randomly selecting node addresses from this large address space. However, large address spaces not only enable companies to associate more computers with their networks and make it more difficult for people of malicious intent to discover nodes but also make it more difficult for the company's IT personnel to discover the company's nodes so that the nodes can be properly managed. Examples of managing nodes include, among other things, maintaining an inventory of the nodes and the software assets associated with the nodes in order to detect and diagnose network problems and provide up-to-date security settings for the nodes.

More specifically, Internet Protocol version 4 (IPv4) addresses are 32 bits long where no more than 24 bits would be used for IPv4 addresses associated with a single network. Since 24 bits results in a relatively small address space, consecutive IPv4 addresses are frequently assigned to the nodes in a network. Typically, IT personnel can discover each of the IPv4 addresses actively, for example, by sequentially sending an ICMP Echo Request to each of the possible IPv4 addresses associated with a network segment. An ICMP Echo Request is also known as a "ping." Typically it takes a few hours to discover the node addresses associated with an IPv4 network by pinging the nodes. However, this also makes it easy for malicious individuals to discover the IPv4 addresses associated with a network. For example, once a malicious individual has discovered one IPv4 address, the malicious individual can ping consecutive IPv4 addresses.

In contrast, Internet Protocol version 6 (IPv6) addresses are 128 bits and 64 bits or more may be used for IPv6 addresses associated with a single network. 64 bits results in a large address space from which IPv6 addresses can be assigned randomly, instead of being assigned consecutively, to nodes associated with a network making it difficult for malicious individuals to discover IPv6 addresses. It would take up to 5000 years to discover the node addresses in an IPv6 network even with a 40 Gigabit per second network. To make it even more difficult, many node platforms have disabled the ability for the nodes to respond to a multicast ping that could be used to discover many nodes' IPv6 addresses at once. This not only makes it difficult for malicious individuals to discover IPv6 addresses, but also makes it difficult for IT personnel to discover IPv6 addresses.

Various embodiments use the fact that network elements, such as a switch, are used for communicating packets across networks. According to one embodiment, a network element is used to passively discover node addresses associated with packets that are communicated through the network element. For example, the node addresses of packets that were communicated through network elements can be saved. Each time a packet is communicated through a network element, the node address that was extracted from that packet can be compared to previously saved node addresses to determine if this is a node address that has not been encountered before. The node addresses themselves may be saved and compared or an abstraction, such as a hash key, of the node addresses can be saved and compared. An embodiment that uses an abstraction shall be referred to as an "abstraction embodiment."

Since network elements process a large number of packets, in order to prevent packets from queuing up at the network element, various methods can be used to discover node addresses efficiently. For example, as will become more evident, node addresses can be discovered efficiently by saving and comparing abstractions of node addresses using, for example, a Bloom Filter. In another example, the packets that the node addresses are extracted from are selected randomly. An embodiment that involves randomly selecting packets shall be referred to as a "random packet selection embodiment." The abstraction embodiment and the random packet selection embodiment may be used separately or together.

Systems that Use Apparatuses for Efficiently Detecting Node Addresses

Figure 2:
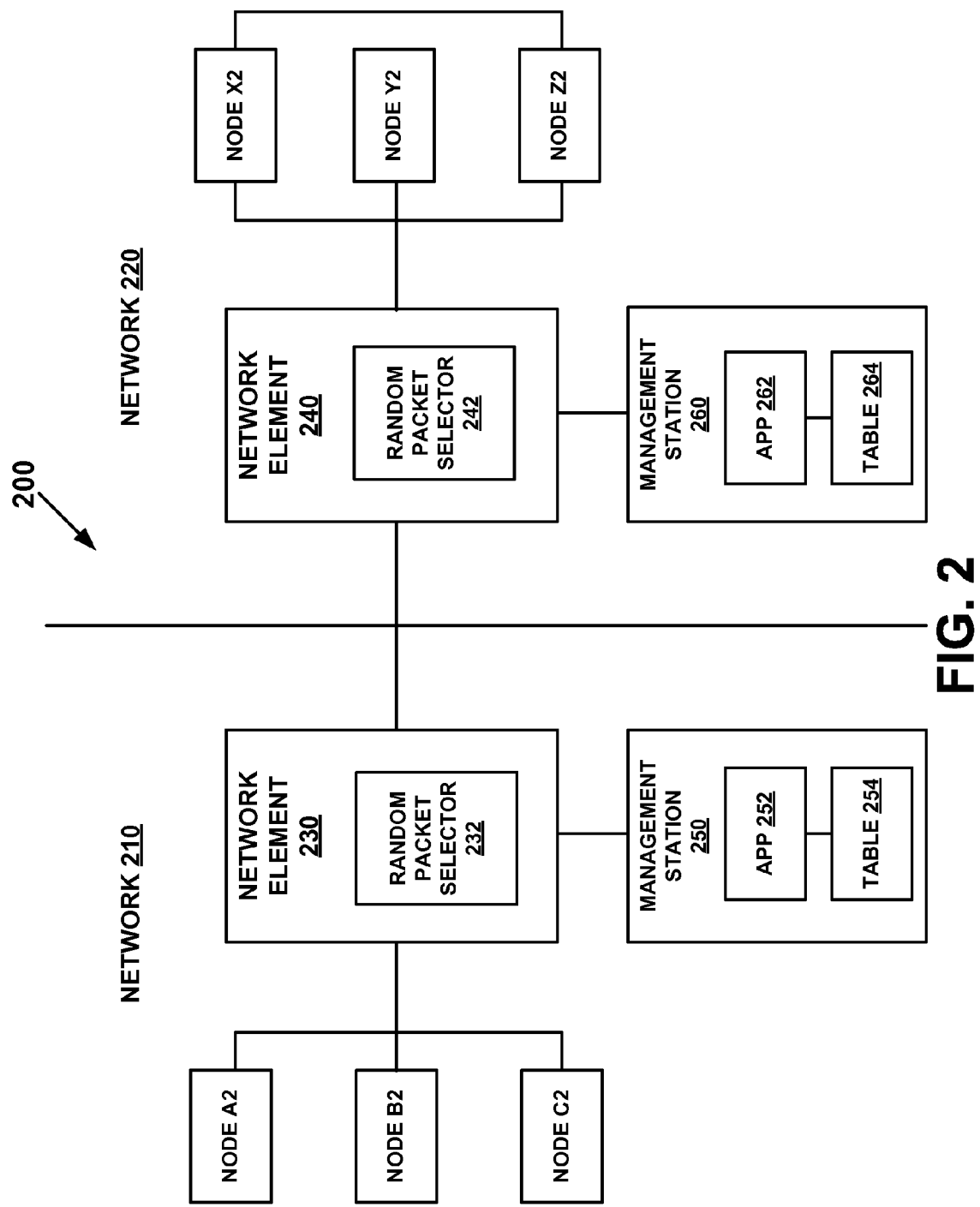

FIGS. 1 and 2 depict block diagrams of systems that use apparatuses for efficiently detecting node addresses, according to various embodiments. The blocks that represent features in FIGS. 1 and 2 can be arranged differently than as illustrated, and can implement additional or fewer features than what are described herein. Further, the features represented by the blocks in FIGS. 1 and 2 can be combined in various ways. The systems 100 and 200 can be implemented using software, hardware, firmware, or a combination thereof.

FIG. 1 depicts a block diagram of a system 100 that uses the abstraction embodiment. The system 100 includes two networks 110, 120 with respective nodes A1-C1, X1-Z1 and network elements 130, 140 that are used for communicating packets between nodes A1-C1, X1-Z1 associated with different networks 110, 120. The network elements 130, 140 communicate with management stations 150, 160. Each of the network elements 130, 140 include an apparatus 300 for efficiently detecting node addresses for the respective nodes A1-C1, X1-Z1 and a table 132, 142 for saving node addresses, or abstractions of node addresses, for previously received packets. According to one embodiment, an apparatus 300 extracts a node address from a packet that is communicated through the network element 130, 140 where the apparatus 300 resides, and determines if the node address has been encountered before by comparing the node address' abstraction to the abstractions saved in the table 132, 142. If the node address has not been encountered before, the abstraction is added to the table 132, 142. The apparatus 300 can communicate the newly discovered node address to its corresponding management station 150, 160 which saves the received node address.

FIG. 2 depicts a block diagram of another system 200 that uses the random packet selection embodiment. The system 200 includes two networks 210, 220 with respective nodes A2-C2, X2-Z2 and network elements 230, 240 that are used for communicating packets between nodes A2-C2, X2-Z2 associated with different networks 210, 220. The network elements 230, 240 each include a random packet selector 232, 242 that randomly selects packets for extracting node addresses from. A network element 230, 240 communicates the extracted node addresses to a respective management station 250, 260 that includes an apparatus 252, 262 for efficiently detecting node addresses. A management station 250, 260 also includes a table 254, 264, which is coupled to the apparatus 252, 262, for saving node addresses for previously selected packets. The apparatus 252, 262 receives the node address that was extracted from the packet that was randomly selected and determines if the node address has been encountered before by comparing the node address to node addresses saved in the table 254, 264. The node address is added to the table 254, 264 if the table 254, 264 does not already include the node address.

Nodes X1-Z1, X2-Z2 associated with a network 120, 220, according to one embodiment, can communicate directly with each other in a peer-to-peer fashion. For example, nodes X1, Y1, Z1 depicted in FIG. 1 and nodes X2, Y2, Z2 depicted in FIG. 2 are associated with respective wireless mesh networks 120, 220 that enable peer-to-peer communications.

Although FIGS. 1 and 2 depict a one to one correlation between network elements 130, 140, 230, 240 and management stations 150, 160, 250, 260, various embodiments are well suited to a plurality of network elements communicating with a management station.

Nodes

A node may be a mobile device such as a cell phone, a laptop, or a personal digital assistant (PDA), among other things. A node may be an electronic device that is used in a home (also referred to herein as a "home device"), such as a kitchen appliance, a computer, a printer, and a laptop, among other things. A node may be an electronic device that is used for work (also referred to herein as "work devices"), such as a computer, a laptop, a phone, a PDA, and a printer, among other things.

Network Element

Packets that are being communicated from one network to another network are communicated through a network element. Examples of network elements include, but are not limited to, a switch, a router, and a network address translation (NAT) system. Network elements can be managed or not managed. A managed network element enables IT personnel to determine information pertaining to the managed network element and to change various parameters associated with the managed network element. An example of a non-managed network element is the type of router that is typically used in homes.

Even nodes that are capable of peer-to-peer communications with other nodes associated with the same network usually communicate with nodes outside of their network at some point in time. Therefore, various embodiments using network elements to perform passive detection of node addresses is well suited for systems that include a peer-to-peer communication's network, such as a wireless mesh network.

Node Addresses

Node addresses may be routable or non-routable. Examples of routable node addresses include, but are not limited to, IPv4 and IPv6. Examples of non-routable node addresses include, but are not limited to, Ethernet node addresses. A node address that is extracted from a packet can be either a source address or a destination address. Both the source address and the destination address can be extracted.

Extracting and analyzing destination addresses enables the detection of nodes that are not sending packets, but which are receiving packets. These nodes may be malicious or malfunctioning.

Management Station

According to one embodiment, one or more network elements communicate node addresses to a management station. A management station can be part of Hewlett Packard (HP)'s Network Node Manager (NNM). The network element may or may not have already determined that the node address has not been encountered before. If the network element has not made that determination, the management station may determine whether the node address has been encountered before. The management station may or may not also determine and save an abstraction of the node address. The management station may use a Bloom Filter to compare an abstraction to previously saved abstractions to determine whether the node address has been encountered before.

A management station can use data structures or databases. For example, a management station can maintain a hash table listing the previously encountered node addresses or abstractions of those previously encountered node addresses. Hash tables are time-efficient data structures, and can be made relatively space efficient. Hash tables are not ideal when entries are frequently deleted from entries. However, deletions are not required by various embodiments.

A malicious node could flood or pollute a management stations data structure or database by generating packets with fake source or fake destination addresses in an attempt to confuse other network management functions or the IT personnel. One possible defense against this type of attack would be to check the number of nodes reported on a network segment against a pre-configured threshold, which represents an estimate of the largest number of nodes that should be connected. That would allow IT personnel to realize the something unusual was happening to the network, triggering a more careful investigation.

Abstractions of Node Addresses

According to one embodiment, abstractions of node addresses are hash keys that were determined by hashing node addresses. The abstractions can be saved, for example, in a table so that an abstraction for a future packet's node address can be compared to each of the table's abstractions to determine if the future packet's node address has been detected before.

The Plurality of Abstractions for Previously Received Packets

According to one embodiment, the efficiency of detecting node addresses is improved by comparing abstractions of node addresses to each other. Abstractions of node addresses associated with previously received packets can be stored, for example, in a table. The abstraction for a newly received packet's node address can be compared to each of the abstractions saved in the table.

Since abstractions enable determining node addresses efficiently, as will become more evident, the processes of saving abstractions, comparing abstractions, and adding abstractions to a table can be performed by a network element in a manner that avoids packets queuing up at the network element.

Bloom Filter

According to one embodiment, a Bloom Filter is used as a part of comparing the abstractions to determine whether a newly received abstraction has been detected before. A Bloom Filter provides for an efficient way of comparing abstractions but also is space efficient. A Bloom Filter is a bit array of m bits that are initially set to 0. A hash key value, also referred to herein as the abstraction, is generated for a node address.

K different hash functions each map the abstraction to one of the positions of the m bits. The k different hash functions that are each mapped to the abstraction can be generated in a number of ways. There will be little if any correlation between the m bits if a strong hash function with a wide output is used to generate abstractions. Therefore, a strong hash function can be used to generate multiple different hash functions, for example, by partitioning the strong hash function's output into multiple bit fields. Alternatively, k different hash functions can be generated using an abstraction and k different initial values, such as 0 to k−1. The k different initial values, such as 0 to k−1, can be received by a hash function that is designed to receive an initial value. Then the value that is generated by the hash function based on the k initial values can be appended to the single key value that represents the node address. Therefore, the first hash function of the k different hash functions can be generated by appending the abstraction with the key value generated based on the initial value 0, the second hash function of the key different hash functions can be generated by appending the abstraction with the key value generated based on the initial value 1 and so on to the initial value k−1.

According to one embodiment, k hash functions are used. Double hashing or triple hashing, which is a variant of double hashing, can be used to determine the k indices using simple arithmetic on two or three indices computed with independent hash functions.

The abstraction shall also be referred to as "an element" that can be added to the k hash functions associated with the Bloom filter and that can be queried to determine if the element has already been added to the Bloom filter. When an element is added to the Bloom Filter, the element is received at each of the k hash functions. K bit positions associated with the Bloom Filter are returned. The bits at all of these positions are set to 1 when an element is added to the Bloom Filter.

A Bloom Filter can result in a "false positive" indicating that an element has already been added when in fact it has not already been added. For example, assume that node addresses X1 and Y1 both hash to the same k hash values. If the abstraction for node address X1 has already been added, then a false positive will result when checking to see if the abstraction for node address Y1 has been added.

When the Bloom Filter is queried to determine if an element has already been added, the element is received at each of the k hash functions and k bit positions associated with the Bloom Filter are returned. If any of the bits associated with these positions are 0, then the element is not associated with the k hash functions. If all of the bits are set to 1, then either the element has already been associated with the K hash functions or a "false positive" situation has occurred.

The choice of k influences the rate that false positives occur. The size of the table depends on estimates of the number of node addresses that will be encountered. According to one embodiment, assuming an optimal value for k, a Bloom Filter with 1% error can be obtained using 9.6 bits per element resulting in a Bloom Filter array with m bits that has a size of 9.6 bits times N elements, therefore, M=9.6×N. The ratio of the number N of inserted elements to the number m of bits in the array can be used as a part of determining the number of hash functions. According to one embodiment, the optimal value for k is approximately 0.7 times m bits divided by N elements. In other words, the optimal k=approximately 0.7×M/N. Therefore, 6 or 7 hash functions would result in a false positive rate of approximately 1%.

Bloom Filter processing can be performed at a network element, for example, as a part of an abstraction embodiment or can be performed at a management station, for example, as a part of a random packet selection embodiment, among other things.

One way of reducing the rate of false positives is to clear the table periodically, which may allow discovery of node Y1 if it sends a packet before node X1 does. In another embodiment, the k hash functions may be changed when the table is cleared, thus reducing the chance that the same two nodes will collide in any given "epoch."

If a malicious person can determine a node address Q that results in an abstraction that is the same as the abstraction for another node address R, then the malicious person can use the node address Q to hide behind the node address R. This kind of attack can be made much more difficult if the k hash functions are kept secret from the nodes. One approach is to include a randomly chosen number as a part of each of the k hash functions and to change this randomly chosen number each time the table is cleared. Since adding the abstraction to the table and the determination of whether the abstraction has been encountered before are performed locally by either a network element or a management system, neither the network element nor the management system will ever have a necessity to reveal the randomly chosen numbers to any other entity.

The table contents, along with the k hash functions and abstractions, do not need to be retained across network element reboots. Clearly the table at each reboot, according to one embodiment, results in the management station being informed of node addresses that it already knows about, which does not cause any harm.

Randomly Selecting Packets

According to one embodiment, the efficiency of detecting node addresses is improved by randomly selecting the packets that the node addresses are extracted from. According to one embodiment, sFlow, which is a part of HP's ProCurve Networking, is used as a part of randomly selecting packets. The "Packet Flow Sampling" mechanism provided by each sFlow Instance ensures that any packet observed at a Data Source has an equal chance of being sampled, irrespective of the Packet Flow(s) to which that packet belongs. sFlow also provides a mechanism for communicating information to a management station, including packet formats. One possible packet format that can be used is the "struct sampled_ipv6," which contains sufficient information for a management station to extract a node address, according to various embodiments.

IT personnel, such as a system administrator, can specify the rate at which sFlow samples packets. A higher sampling rate results in more packet headers being reported to a management station and also results in a higher probability of overloading either the network element where the sampling is occurring, overloading the management station receiving packet headers, or overloading the network between the network element and the management station. According to one embodiment, the sampling rate is set as high as possible given the loads on the network element, the network and the management station without interfering with other traffic. This maximizes the chances of quickly detecting the node address for a relatively low-traffic node. The sampling rate can be adjusted based on traffic conditions. The sampling rate may also be temporarily increased during periodic audits of the network, or when there is reason to believe that some nodes are escaping detection.

Apparatus for Efficiently Detecting Node Addresses

Figure 3:
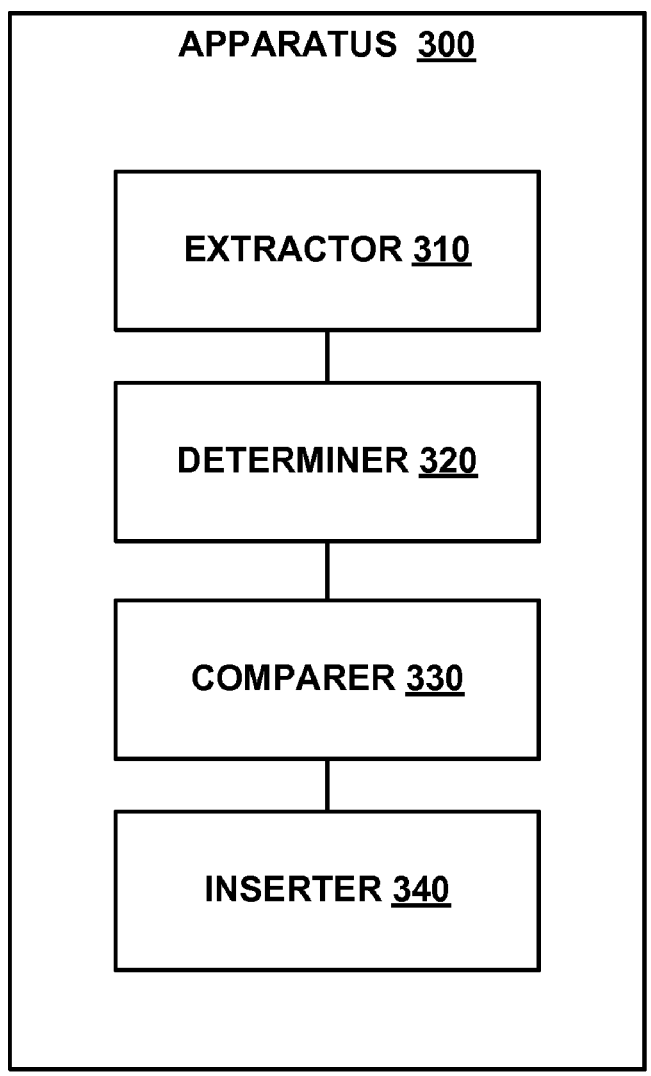
FIG. 3 depicts a block diagram of an apparatus for efficiently detecting node addresses, according to one embodiment.

FIG. 3 depicts a block diagram of an apparatus for efficiently detecting node addresses, according to one embodiment. The blocks that represent features in FIG. 3 can be arranged differently than as illustrated, and can implement additional or fewer features than what are described herein. Further, the features represented by the blocks in FIG. 3 can be combined in various ways. The system 300 can be implemented using software, hardware, firmware, or a combination thereof.

The apparatus 300 includes a node-address-extractor 310 (also referred to as an "extractor"), a node-address-abstraction-determiner 320 (also referred to as a "determiner"), a node-address-abstraction-comparer 330 (also referred to as a "comparer"), and a node-address-abstraction-inserter 340 (also referred to as an "inserter"). The extractor 310 is configured for extracting a node address from a packet that is being communicated through a network element from a first network to a second network. The determiner 320 is configured for determining an abstraction of the node address. The comparer 330 is configured for comparing the abstraction to a plurality of abstractions that correspond to node addresses extracted from the plurality of previously received packets as a part of determining whether any previously received packets correspond to the node address. The inserter 340 is configured for adding the abstraction to the plurality of abstractions if the node address does not correspond to any of the previously received packets.

Method of Efficiently Detecting Node Addresses

Figure 4:
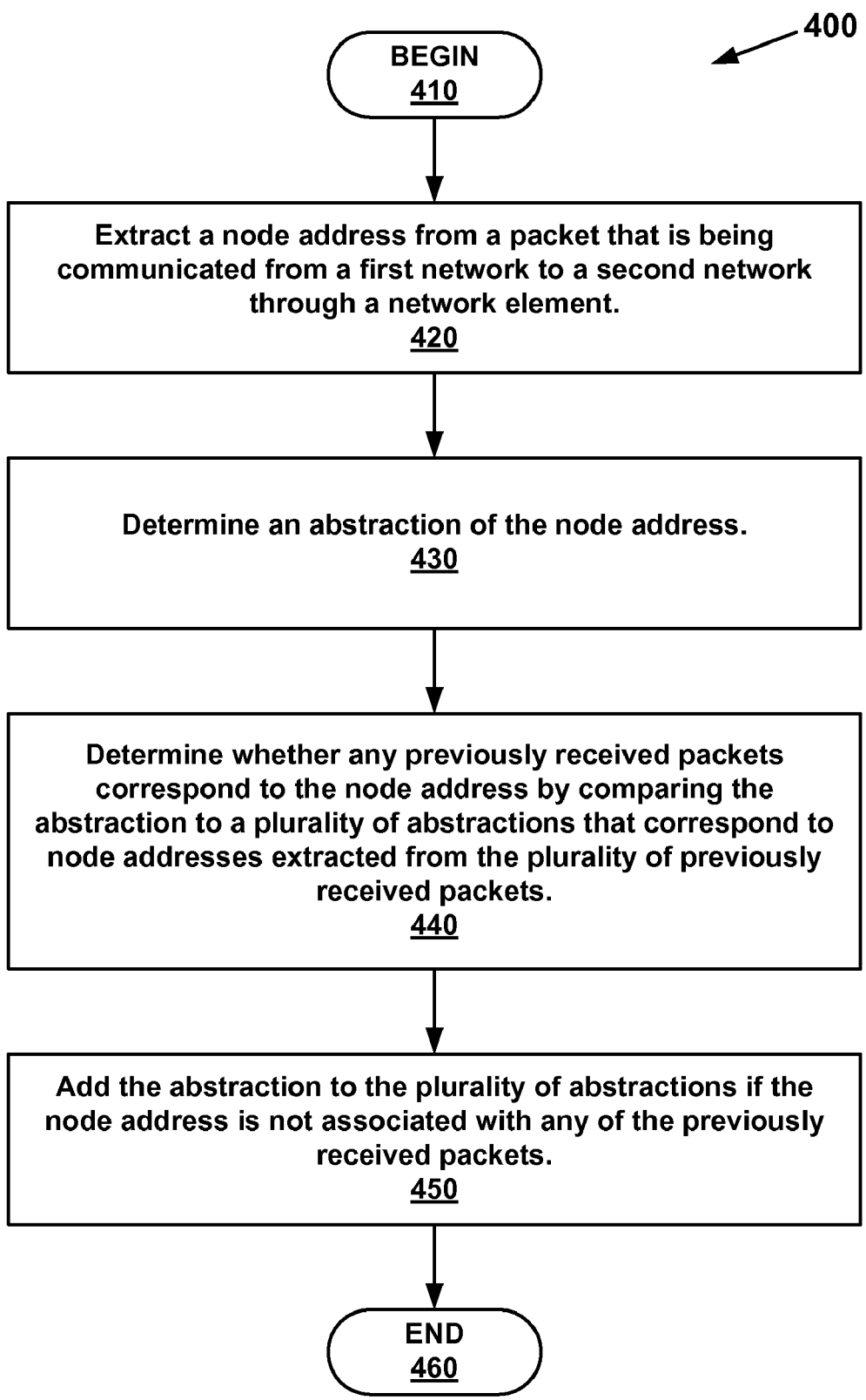
FIGS. 4 and 5 depict flowcharts for methods of efficiently detecting node addresses, according to various embodiments.
Figure 5:
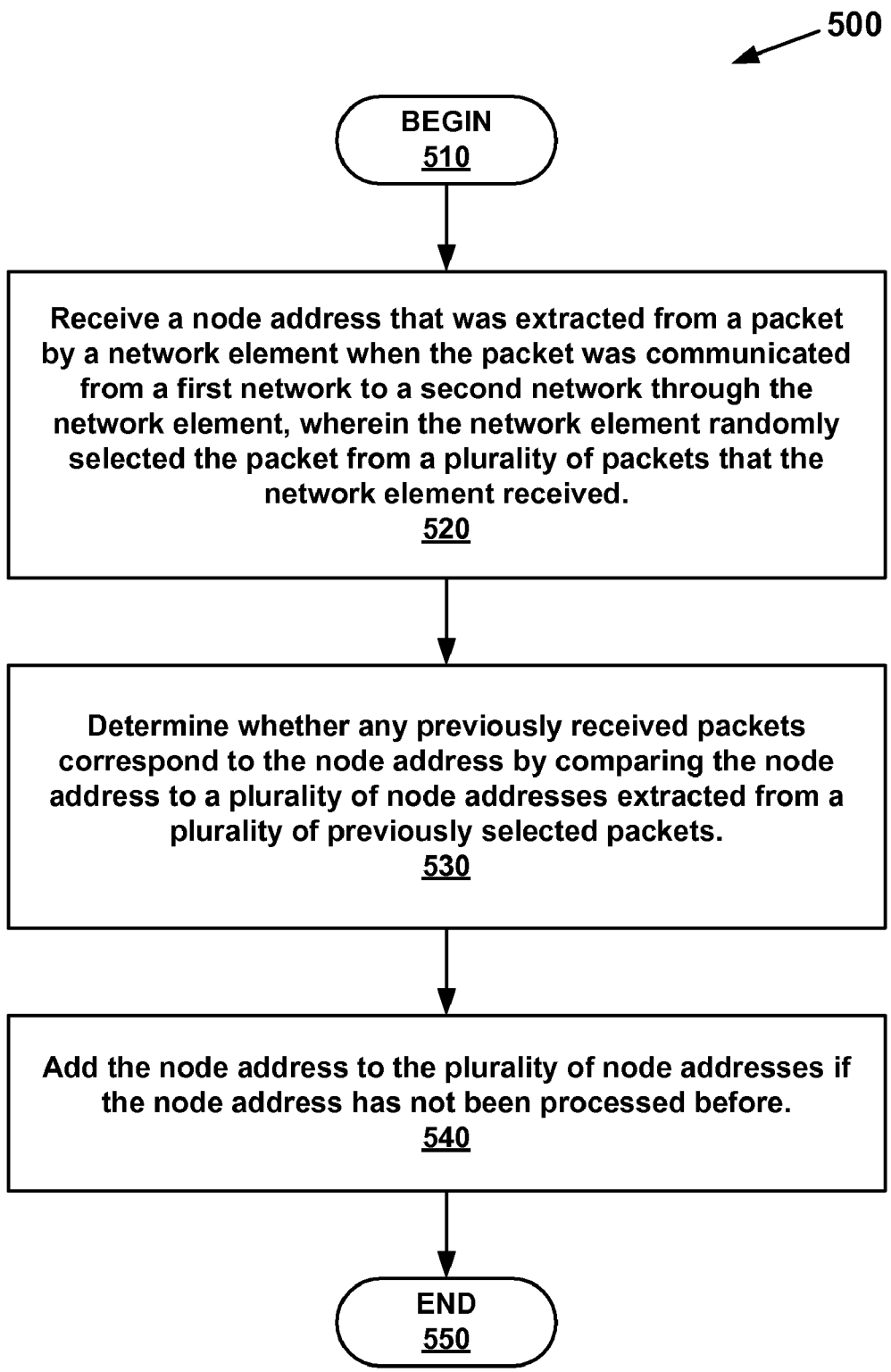

FIGS. 4 and 5 depict flowcharts for methods of efficiently detecting node addresses, according to various embodiments. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed.

All of, or a portion of, the embodiments described by flowchart 300 can be implemented using computer-usable media and computer-executable instructions which reside, for example, in computer-usable media of a computer system or like device. The computer-usable media can be any kind of memory that instructions can be stored on. Examples of the computer-usable media include but are not limited to a disk, a compact disk (CD), a digital video device (DVD), read only memory (ROM), flash, and so on. As described above, certain processes and steps of embodiments of the present invention are realized, in one embodiment, as a series of instructions (e.g., software program) that reside within computer readable memory of a computer system and are executed by the processor of the computer system. When executed, the instructions cause the computer system to implement the functionality of various embodiments of the present invention as described below.

The following description of flowchart 400 shall refer to the system depicted on FIG. 1 and the apparatus depicted on FIG. 3.

At 410, the method begins.

At 420, a node address is extracted from a packet that is being communicated from a first network to a second network through a network element. For example, assume that the network element 140 associated with network 120 receives a packet from node X1. The apparatus' extractor 310 associated with the network element 140 extracts either the source address or the destination address or both from the received packet. Although more than one node address can be extracted, for the sake of simplicity, this illustration shall refer to one node address that is extracted.

According to one embodiment, the apparatus 300 selects the packet that the node address is extracted from using random sampling, as described herein.

According to one embodiment, packets that arrive from certain network elements can be ignored. For example, if a packet comes from outside of an organization, there may be no need to detecting their source address. More specifically, assume that node X1 in network 120 is sending a packet to node A1 in network 110. The network element 140 in network 120 would detect node X1's node address but network element 130 would ignore the packet, according to one embodiment, when the packet arrives at network 110.

At 430, an abstraction of the node address is determined. For example, the determiner 320 determines an abstraction, such as a hash key, based on the node address, as described herein. K different hash functions that are generated as described herein may be mapped to the abstraction.

At 440, a determination is made as to whether any previously received packets correspond to the node address. For example, the table 142 includes a plurality of abstractions that correspond to node addresses extracted from the plurality of previously received packets. The comparer 330 can compare the abstraction that was determined at 430 with each of the abstractions stored in the table 142 to determine whether any previously received packets correspond to the node address that the abstraction represents. According to one embodiment, the comparer 330 uses a Bloom Filter as described herein. For example, the abstraction can be received by each of the k hash functions, as described herein. The returned bit positions are analyzed to determine whether the corresponding node address has been encountered before.

At 450, the abstraction is added to the plurality of abstractions if the node address is not associated with any of the previously received packets. For example, the inserter 340 adds the abstraction to the table 152 if the table 152 does not include the abstraction. If the table 142 included the abstraction for node X1's address, then the abstraction for node X1's address would not be added. If the table 142 does not include the abstraction for node X1's address, then the inserter 340 adds the abstraction for node X1's address to the table 142. The inserter 340 can use a Bloom Filter as described herein.

At 460, the method ends.

The node address that corresponds to an abstraction that is added to the table 152 is communicated to a management station 160, according to one embodiment. Continuing the example, node X1's address is communicated to the management station 160 associated with network 120. Single node addresses or a plurality of node addresses can be communicated to a management station 160. An apparatus 300 may bundle a plurality of node addresses and communicate the bundle to a management station 160 to save on network traffic.

The following description of flowchart 500 shall refer to the system depicted on FIG. 2.

At 510, the method begins.

At 520, a node address that was extracted from a packet by a network element when the packet was communicated from a first network to a second network through the network element is received. For example, assume that the network element 240 associated with network 220 receives a plurality of packets from the nodes A2-C2 and X2-Z2. Assume that the random packet selector 242 randomly selects a packet, which was received from node X2, from the plurality of received packets that the network element 240 received. The network element 240 extracts the source address or the destination address or both, from the randomly selected packet. Although more than one node address can be extracted, for the sake of simplicity, this illustration shall refer to one node address that is extracted. The network element 240 communicates the extracted node address to the respective management station 260. Extracted node addresses can be communicated to a management station 260 one at a time or may be bundled together and communicated as a bundle to save on network traffic.

According to one embodiment, packets that arrive from certain network elements can be ignored. For example, if a packet comes from outside of an organization, there may be no need for detecting their source address. More specifically, assume that node X2 in network 220 is sending a packet to node A2 in network 210. The network element 240 in network 220 would detect node X2's node address but network element 230 would ignore the packet, according to one embodiment, when the packet arrives at network 210.

At 530, a determination is made as to whether any previously received packets corresponds to the node address by comparing the node address to a plurality of node addresses extracted from a plurality of previously selected packets. For example, the apparatus 262 associated with the management station 260 compares the extracted node address to each of the node addresses stored in the table 264. The apparatus 262 may or may not use a Bloom Filter as a part of making the determination at 530. If a Bloom Filter is used, the node addresses may be saved and compared in the form of "abstractions," as described herein. Otherwise, node addresses themselves can be saved and compared. If a Bloom Filter is used, a determination is made, according to one embodiment, by inputting the abstraction into each of the k hash functions as described herein. The returned bit positions can be analyzed to determine if the corresponding node address has been encountered before.

At 540, the node address is added to the plurality of node addresses if the node address has not been processed before. If the table 264 does not already include the node address that was extracted at 520, the extracted node address is added to the table 264. The apparatus 262 may or may not use a Bloom Filter as a part of adding a node address. If a Bloom Filter is used, the node address is added to the table 264 in the form of an "abstraction," as described herein. Otherwise, the node address itself can be added to the table 264.

If a Bloom Filter is used, the apparatus 262 can also save the node address, for example, in another table.

At 550, the method ends.

Various embodiments for discovering node addresses can be combined with techniques, such as mining the logs from Dynamic Host Configuration Protocol (DHCP) servers.

CONCLUSION

Various embodiments provide for efficiently detecting node addresses by either using the abstraction embodiment or the random packet selection embodiment, or a combination thereof. Various embodiments provide for discovering node addresses without depending on artificially constraining the size of address spaces. Various embodiments provide for detecting the node addresses of improperly managed computers that have not followed organizational rules for address assignment. Therefore, various embodiments enable IT personnel to find and manage nodes before malicious individuals can find the nodes and exploit the nodes.

Various embodiments have been described in various combinations. However, any two or more embodiments may be combined. Further, any embodiment may be used separately from any other embodiments.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A method for efficiently detecting node addresses, the method comprising:
   extracting a node address from a packet that is being communicated from a first network to a second network through a network element;
   determining an abstraction of the node address;
   determining whether any previously received packets correspond to the node address by comparing the abstraction to a plurality of abstractions that correspond to node addresses extracted from the plurality of previously received packets; and
   adding the abstraction to the plurality of abstractions if the node address is not associated with any of the previously received packets.

2. The method as recited by claim 1, wherein the extracting of the node address from the packet further comprises:
   extracting the node address that is selected from a group consisting of an Internet Protocol Version 6 (IPv6) node address, an Internet Protocol Version 4 (IPv4) node address, and an Ethernet node address.

3. The method as recited by claim 1, wherein the determining of whether any previously received packets correspond to the node address further comprises:
   using a Bloom Filter to determine whether any of the previously received packets correspond to the node address.

4. The method as recited by claim 1, wherein the determining of the abstraction of the node address further comprises:
   determining a hash key based on the node address.

5. The method as recited by claim 1, wherein the method further comprises:
   communicating the node address to a management station if the node address is not associated with any of the previously received packets.

6. The method as recited by claim 1, wherein the extracting of the node address from the packet that is being communicated from the first network to the second network through the network element further comprises:
   extracting the node address from the packet that is being communicated from the first network to the second network through the network element that is selected from a group consisting of a switch, a router, and a network address translation (NAT) system.

7. An apparatus for efficiently detecting node addresses, the apparatus comprising:
   a node-address-extractor configured for extracting a node address from a packet that is being communicated through a network element from a first network to a second network;
   a node-address-abstraction-determiner configured for determining an abstraction of the node address;
   a node-address-abstraction-comparer configured for comparing the abstraction to a plurality of abstractions that correspond to node addresses extracted from the plurality of previously received packets as a part of determining whether any previously received packets correspond to the node address; and
   a node-address-abstraction-inserter configured for adding the abstraction to the plurality of abstractions if the node address does not correspond to any of the previously received packets.

8. The apparatus of claim 7, wherein the apparatus further comprises a node-address-communicator configured for communicating the node address to a management station if the node address is not associated with any of the previously received packets.

9. The apparatus of claim 7, wherein the apparatus is located at a network element.

10. The apparatus of claim 7, wherein the apparatus further comprises a random packet selector for randomly selecting which packets node addresses will be extracted from.

11. The apparatus of claim 7, wherein the node-address-abstraction-comparer is configured to use a Bloom Filter to compare the abstraction to the plurality of abstractions.

12. The apparatus of claim 7, wherein the network element is selected from a group consisting of a switch, a router, and a network address translation (NAT) system.

13. The apparatus of claim 7, wherein the node address is selected from a group consisting of an Internet Protocol Version 6 (IPv6) node address, an Internet Protocol Version 4 (IPv4) node address, and an Ethernet node address.

14. The apparatus of claim 7, wherein the abstraction is a hash key of the node address.

15. A method for efficiently detecting node addresses, the method comprising:
   receiving a node address that was extracted from a packet by a network element when the packet was communicated from a first network to a second network through the network element, wherein the network element randomly selected the packet from a plurality of packets that the network element received;
   determining whether any previously received packets corresponds to the node address by comparing the node address to a plurality of node addresses extracted from a plurality of previously selected packets; and
   adding the node address to the plurality of node addresses if the node address has not been processed before.

16. The method as recited by claim 15, wherein the receiving of the node that was extracted from the packet by the network element further comprises:

receiving the node address that was extracted from the packet by the network element, which used sFlow as a part of randomly selecting the packet.

17. The method as recited by claim 15, wherein the receiving of the node address further comprises:

receiving the node address at an apparatus that is located on a management station.

18. The method as recited by claim 15, wherein the receiving of the node address that was extracted from the packet further comprises:

receiving the node address that is selected from a group consisting of an Internet Protocol Version 6 (IPv6) node address, an Internet Protocol Version 4 (IPv4) node address, and an Ethernet node address.

19. The method as recited by claim 15, wherein the determining of whether any previously received packets corresponds to the node address further comprises:

using a Bloom Filter to determine whether any previously received packets corresponds to the node address.

20. The method as recited by claim 15, wherein the receiving of the node address that was extracted from the packet by the network element further comprises:

receiving the node address that was extracted from the packet by the network element that is selected from a group consisting of a switch, a router, and a network address translation (NAT) table.

* * * * *